United States Patent
Kuo et al.

(10) Patent No.: US 10,333,259 B1
(45) Date of Patent: Jun. 25, 2019

(54) POWER DISTRIBUTION UNIT

(71) Applicants: Yu-Chen Kuo, Taipei (TW); Yung-Hao Peng, Taipei (TW); Wen-Pin Lai, Taipei (TW)

(72) Inventors: Yu-Chen Kuo, Taipei (TW); Yung-Hao Peng, Taipei (TW); Wen-Pin Lai, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 0 days.

(21) Appl. No.: 15/970,113

(22) Filed: May 3, 2018

(51) Int. Cl.
*H01R 13/717* (2006.01)
*H01R 13/66* (2006.01)
*H01R 9/24* (2006.01)
*H01R 13/514* (2006.01)

(52) U.S. Cl.
CPC ......... *H01R 13/665* (2013.01); *H01R 9/2491* (2013.01); *H01R 13/514* (2013.01); *H01R 13/7175* (2013.01)

(58) Field of Classification Search
CPC .. H01R 13/665; H01R 13/514; H01R 9/2491; H01R 13/7175
See application file for complete search history.

(56) References Cited

U.S. PATENT DOCUMENTS

2016/0054771 A1* 2/2016 Fallon ...................... G06F 1/26
 713/300
2016/0225246 A1* 8/2016 Huang ................. H01R 25/006

FOREIGN PATENT DOCUMENTS

| CN | 101740954 A | 6/2010 |
| CN | 202363697 U | 8/2012 |
| CN | 205583297 U | 9/2016 |

* cited by examiner

*Primary Examiner* — Daniel J Cavallari
(74) *Attorney, Agent, or Firm* — Bacon & Thomas, PLLC (57) ABSTRACT

A power distribution unit comprising at least two conductors, a plurality of outlets, a plurality of indicator lights, an AC-DC conversion circuit, and a control circuit is provided. Each outlet is electrically coupled to two of the conductors. Each indicator light corresponds to one of the outlets. The input of the AC-DC conversion circuit is electrically coupled to two of the conductors. The control circuit is electrically coupled to the indicator lights and the output of the AC-DC conversion circuit. The control circuit is configured for sequentially driving the indicator lights, and is configured for controlling, according to the group information of each grouped outlet, a corresponding indicator light to display a corresponding color of a group to which the grouped outlet belongs.

14 Claims, 10 Drawing Sheets

POWER DISTRIBUTION UNIT

BACKGROUND OF THE INVENTION

Field of the Invention

The present invention relates to the technical field of power supply, and more particularly, to a power distribution unit.

Description of Related Art

For the time being, the power distribution unit has been widely used in various types of equipment rooms (e.g., data centers) to distribute power required by various types of equipment However, as the equipment in the equipment room becomes more and more complicated, multiple power distribution units may be used in one equipment room, and the same power distribution unit is often electrically coupled to different equipment, resulting in a more complicated line configuration in the equipment room than in the past. This makes the service personnel often take a lot of time for troubleshooting.

SUMMARY OF THE INVENTION

An object of the present invention is to provide a power distribution unit, which makes service personnel quickly identify the types of the equipment which are electrically coupled to the outlets of the power distribution unit, so as to improve the troubleshooting efficiency of the service personnel.

To achieve the above object, the present invention provides a power distribution unit comprising at least two conductors, a plurality of outlets, a plurality of indicator lights, an AC-DC conversion circuit, and a control circuit. Each of the outlets is electrically coupled to two of the conductors. Each of the indicator lights corresponds to one of the outlets. The input of the AC-DC conversion circuit is electrically coupled to two of the conductors. The control circuit is electrically coupled to the indicator lights and the output of the AC-DC conversion circuit, and is configured for sequentially driving the indicator lights and for controlling, according to the group information of each grouped outlet, a corresponding indicator light to display a corresponding color of a group to which the grouped outlet belongs.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
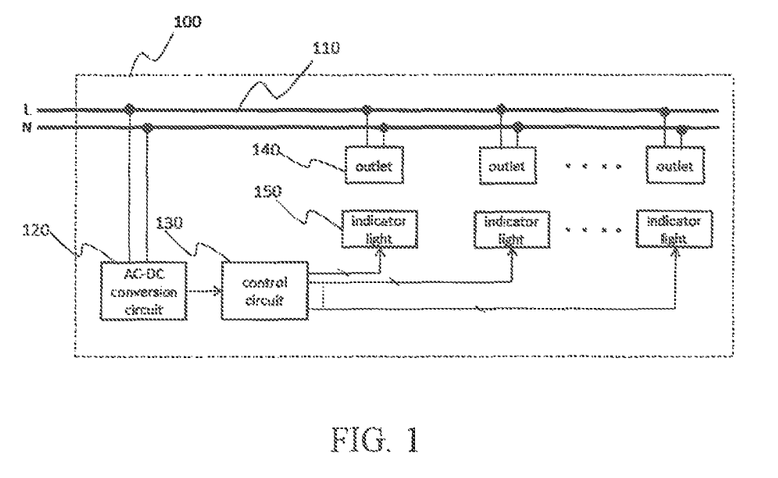
FIG. 1 is a schematic diagram of a power distribution unit according to an embodiment of the present invention.

FIG. 1 is a schematic diagram of a power distribution unit according to an embodiment of the present invention. As shown in FIG. 1, the power distribution unit 100 comprises two conductors 110, an AC-DC conversion circuit 120, a control circuit 130, a plurality of outlets 140, and a plurality of indicator lights 150. One of the conductors 110 is electrically coupled to an AC power source L, and the other conductor 110 is electrically coupled to a neutral line N. Each outlet 140 is electrically coupled to the two conductors 110. Each indicator light 150 corresponds to one of the outlets 140. For example, each indicator light 150 can be disposed adjacent to one of the outlets 140. However, the invention is not limited thereto. The input of the AC-DC conversion circuit 120 is electrically coupled to the two conductors 110. As for the control circuit 130, it is electrically coupled to the above-mentioned indicator lights 150 and the output of the AC-DC conversion circuit 120. The control circuit 130 is configured for sequentially driving the indicator lights 150, and is configured for controlling, according to the group information of each grouped outlet 140, a corresponding indicator light 150 to display a corresponding color of a group to which the grouped outlet 140 belongs. The group information comprises, but is not limited to, information of whether each outlet 140 has been grouped, and information of which group each grouped outlet 140 belongs to. In this embodiment, the control circuit 130 is further configured for recording the group information of each outlet 140.

Accordingly, respective indicator lights 150 of the outlets 140 of different groups can display different colors, so that the service personnel can quickly identify the types of different equipment electrically coupled to the outlets 140. For example, an indicator light 150 may display blue color to indicate that its corresponding outlet 140 is for supplying power to lighting equipment, or may display green color to indicate that its corresponding outlet 140 is for supplying power to communication equipment, or may display red color to indicate that its corresponding outlet 140 is for a supplying power to air conditioning equipment. Certainly, different colors may also be used to indicate different network segments which different devices operate at, or to represent devices of different models. However, the present invention is not limited thereto.

Referring to FIG. 1 again, each indicator light 150 has at least two light sources of different colors, and each light source can be implemented by a light-emitting diode. To explain the present invention more clearly, the following description assumes that each indicator light 150 has a red light-emitting diode, a green light-emitting diode, and a blue light-emitting diode. However, the present invention is not limited thereto.

Figure 2:
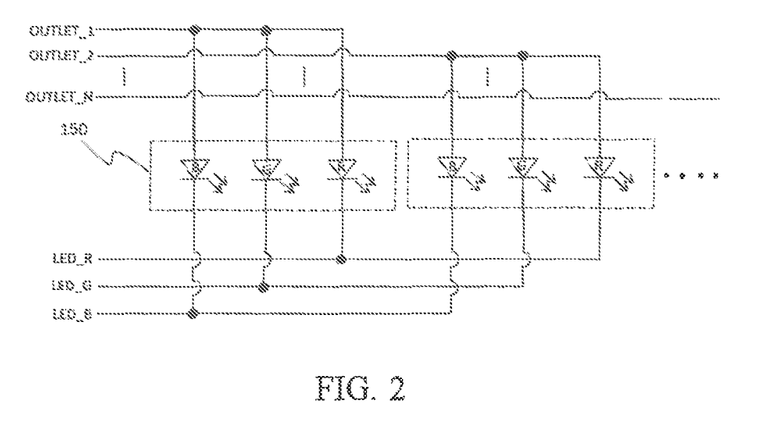
FIG. 2 illustrates a coupling relationship between the control circuit and the indicator lights.

FIG. 2 illustrates a coupling relationship between the control circuit 130 and the indicator lights 150. Referring to FIG. 2, the control circuit 130 has a plurality of first output pins (respectively labeled by OUTLET_1-OUTLET_N, where N is a natural number) and a plurality of second output pins (respectively labeled by LED_R, LED_G, and LED_B). As shown in FIG. 2, each of the first output pins is electrically coupled to an end of each of the light-emitting diodes in one of the indicator lights 150, and each of the second output pins is electrically coupled to the other end of each of the light-emitting diodes having the same color in the indicator lights 150.

Figure 3:
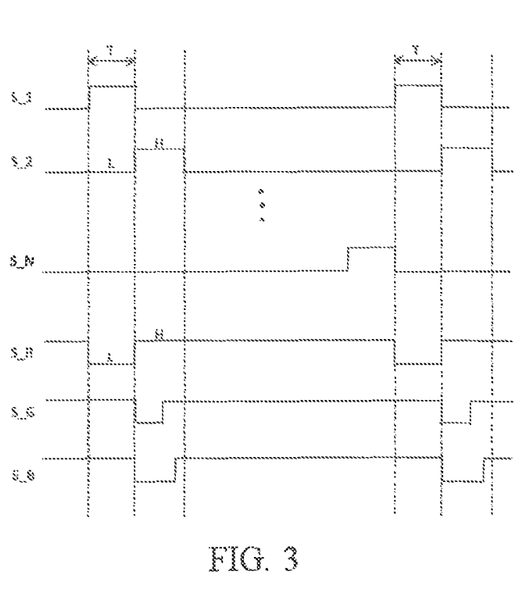
FIG. 3 illustrates a timing of the output signals of the control circuit.

FIG. 3 illustrates a timing of the output signals of the control circuit. In FIG. 3, S_1-S_N represent the output signals of the first output pins OUTLET_1-OUTLET_N, respectively, and S_R, S_G, and S_B represent the output signals of the second output pins LED_R, LED_G, and LED_B, respectively. Referring to FIGS. 3 and 2, the control circuit 130 sequentially pulls up each of the first output pins OUTLET_1-OUTLET_N to a high level (H) for a predetermined time T, and during each predetermined time T the control circuit 130 determines whether to pull down at least one second output pin to a low level (L) according to the group information of a corresponding outlet 140 of the predetermined time T. During the same predetermined time T, if there is only one second output pin having been pulled down to the low level, the corresponding indicator light 150 displays the corresponding color of the said second output pin. In addition, during the same predetermined time T, if there are more than two second output pins having been pulled down to the low level, the corresponding indicator light 150 displays a mixed color. Furthermore, during the same predetermined time T, if there is no second output pin having been pulled down to the low level, the corresponding indicator light 150 is in the turned-off state. This means that the corresponding outlet 140 has not been grouped yet.

Figure 4:
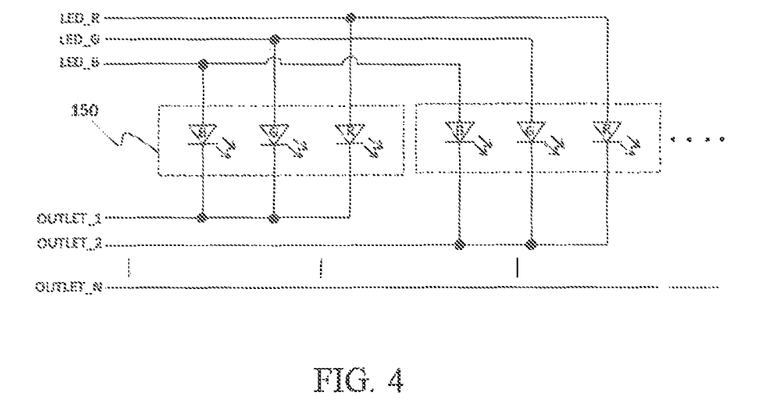
FIG. 4 illustrates another coupling relationship between the control circuit and the indicator lights.

FIG. 4 illustrates another coupling relationship between the control circuit 130 and the indicator lights 150. Referring to FIG. 4, the control circuit 130 has first output pins OUTLET_1-OUTLET_N, and has second output pins LED_R, LED_G, and LED_B. As shown in FIG. 4, each of the first output pins is electrically coupled to an end of each of the light-emitting diodes in one of the indicator lights 150, and each of the second output pins is electrically coupled to the other end of each of the light-emitting diodes having the same color in the indicator lights 150.

Figure 5:
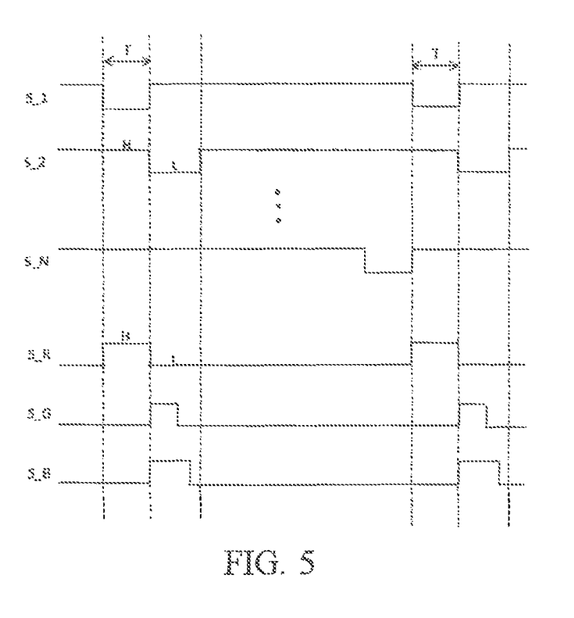
FIG. 5 illustrates another timing of the output signals of the control circuit.

FIG. 5 illustrates another timing of the output signals of the control circuit. In FIG. 5, S_1-S_N represent the output signals of the first output pins OUTLET_1-OUTLET_N, respectively, and S_R, S_G, and S_B represent the output signals of the second output pins LED_R, LED_G, and LED_B, respectively. Referring to FIGS. 5 and 4, the control circuit 130 sequentially pulls down each of the first output pins OUTLET_1-OUTLET_N to the low level (L) for a predetermined time T, and during each predetermined time T the control circuit 130 determines whether to pull up at least one second output pin to the high level (H) according to the group information of a corresponding outlet 140 of the predetermined time T. During the same predetermined time T, if there is only one second output pin having been pulled up to the high level, the corresponding indicator light 150 displays the corresponding color of the said second output pin. In addition, during the same predetermined time T, if there are more than two second output pins having been pulled up to the high level, the corresponding indicator light 150 displays a mixed color. Furthermore, during the same predetermined time T, if there is no second output pin having been pulled up to the high level, the corresponding indicator light 150 is in the turned-off state. This means that the corresponding outlet 140 has not been grouped yet.

From the above descriptions of FIGS. 2-5, it can be seen that the pin number of the control circuit 130 can be reduced since the control circuit 130 sequentially drives the indicator lights 150 and the indicator lights 150 share the second output pins LED_R, LED_G, and LED_B of the control circuit 130. In addition, the driving sequence of the indicator lights 150 may also be changed. It is worth mentioning that the conduction frequency of each indicator light 150 should be at least 30 Hz if the blinking of the indicator light 150 that can be perceived by human eye is not desired.

Figure 6:
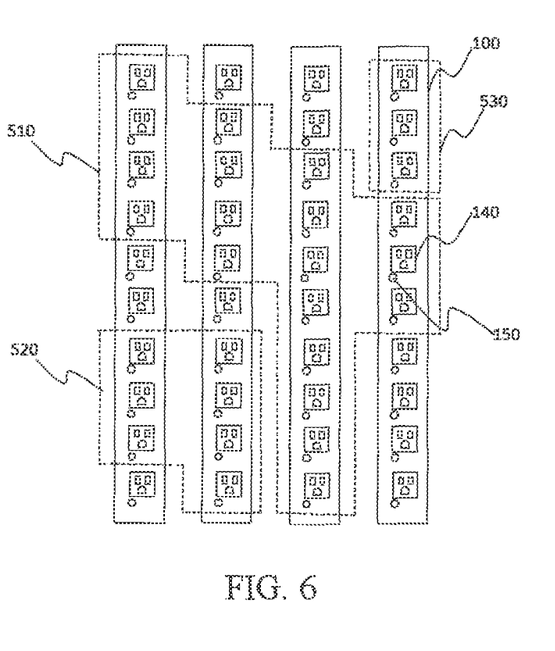
FIG. 6 shows one of the grouping results.

FIG. 6 shows one of the grouping results. In FIG. 6, there are four power distribution units 100. The outlets 140 selected by the dashed box 510 are divided into a first group, the outlets 140 selected by the dashed box 520 are divided into a second group, and the outlets 140 selected by the dashed box 530 are divided into a third group. The outlets 140 in the first group are, for example, for supply power to lighting equipment. The outlets 140 in the second group are, for example, for supply power to communication equipment. The outlets 140 in the third group are, for example, for supply power to air conditioning equipment. The indicator lights 150 corresponding to the first group may, for example, be used for displaying blue color. The indicator lights 150 corresponding to the second group may, for example, be used for displaying green color. The indicator lights 150 corresponding to the third group may, for example, be used for displaying red color.

Figure 7:
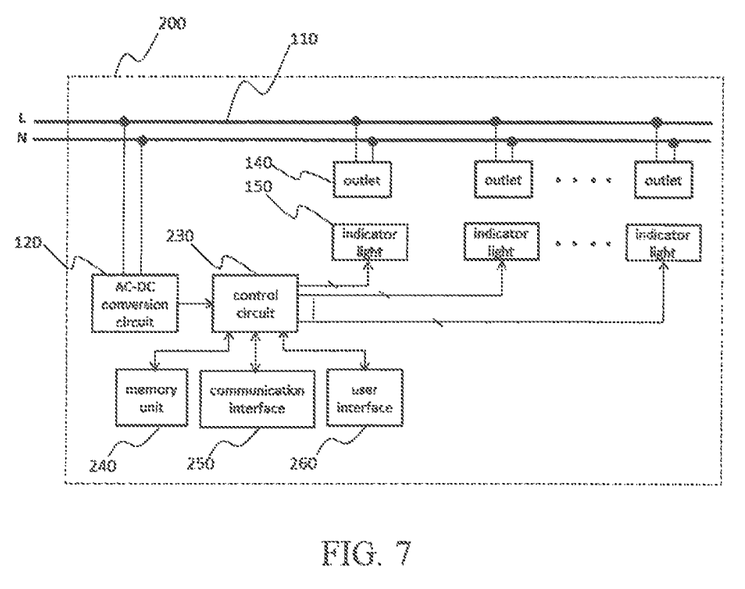
FIG. 7 is a schematic diagram of a power distribution unit according to another embodiment of the present invention.

FIG. 7 is a schematic diagram of a power distribution unit according to another embodiment of the present invention. Referring to FIGS. 7 and 1, compared with the power distribution unit 100 shown in FIG. 1, the power distribution unit 200 shown in FIG. 7 further comprises a memory unit 240, a communication interface 250, and a user interface 260. The memory unit 240, the communication interface 250, and the user interface 260 are electrically coupled to the control circuit 230. In this embodiment, the memory unit 240 is configured for recording the group information of each outlet 140. In this way, the control circuit 230 can access the information stored in the memory unit 240 instead of recording the said information. In addition, the control circuit 230 can receive group settings of any of the outlets 140 through the communication interface 250. Furthermore, the user interface 260 may include at least one of an input interface and a display interface. If the user interface 260 has an input interface, the control circuit 230 can receive group settings of any of the outlets 140 through the input interface. Certainly, whether to adopt the memory unit 240, the communication interface 250, and the user interface 260 depends on actual design requirements.

Figure 8:
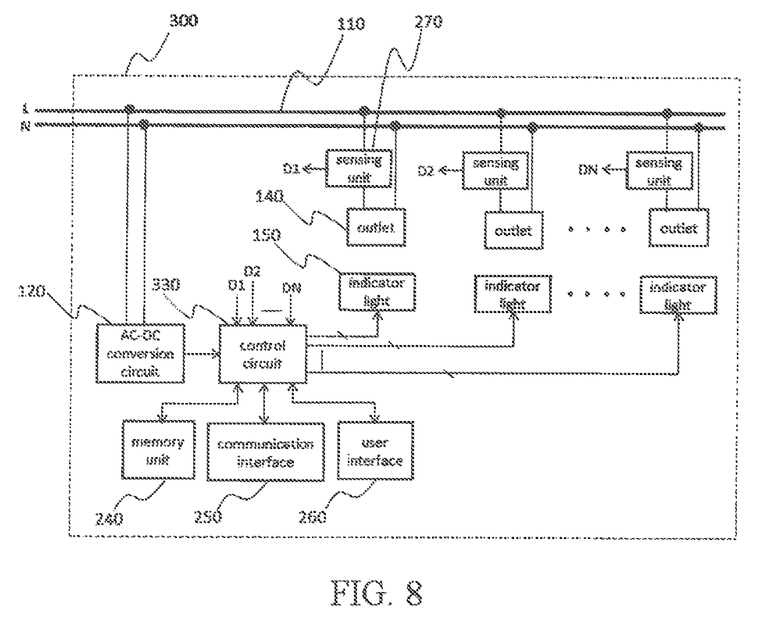
FIG. 8 is a schematic diagram of a power distribution unit according to yet another embodiment of the present invention.

FIG. 8 is a schematic diagram of a power distribution unit according to yet another embodiment of the present invention. Referring to FIG. 8 and FIG. 7, compared with the power distribution unit 200 shown in FIG. 7, the power distribution unit 300 shown in FIG. 8 further comprises a plurality of sensing units 270. Each outlet 140 is electrically coupled to one of the conductors 110 through one of the sensing units 270. Each sensing unit 270 is used to measure current and provide a sensing result (shown as D1-DN, respectively, where N is a natural number). In this embodiment, the control circuit 330 further calculates a corresponding loading according to each sensing result, and controls the displayed color of a corresponding indicator light 150. For example, when the control circuit 330 determines that, according to the to the sensing result D2, one of the devices of the equipment electrically coupled to a corresponding outlet 140 is overloaded, the control circuit 330 controls a corresponding indicator light 150 to display a specific color (e.g., orange) to represent this overload state.

In addition, the control circuit 330 may further calculate a corresponding loading according to each sensing result, and sum up the corresponding loadings of the outlets 140 in the same group to obtain a summation result, so as to control the displayed color of the corresponding indicator lights 150 of the outlets of the same group. For example, when the control circuit 330 determines that, according to a summation result, the equipment electrically coupled to the outlets 140 in the corresponding group is overloaded, the control circuit 330 controls the corresponding indicator lights 150 to display a specific color (e.g., yellow) to represent this overload state.

Figure 9:
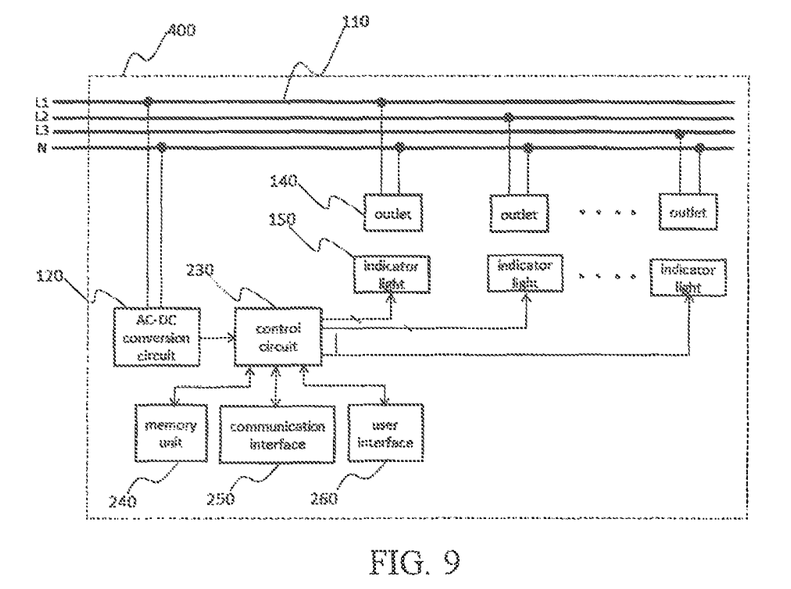
FIG. 9 is a schematic diagram of a power distribution unit according to yet another embodiment of the present invention.

FIG. 9 is a schematic diagram of a power distribution unit according to yet another embodiment of the present invention. Referring to FIGS. 9 and 7, compared with the power distribution unit 200 shown in FIG. 7, the power distribution unit 400 shown in FIG. 9 comprises four conductors 110. In this embodiment, the four conductors 110 are electrically coupled to the neutral line N and the AC power sources L1, L2 and L3, respectively. The phase difference between any two of the AC power sources L1, L2 and L3 is 120 degrees. However, the invention is not limited thereto. In this embodiment, the outlets 140 electrically coupled to the AC power source L1 and the neutral line N are divided into a group, the outlets 140 electrically coupled to the AC power source L2 and the neutral line N are divided into a group, and the outlets 140 electrically coupled to the AC power source L3 and the neutral line N are divided into a group. In addition, the control circuit 230 controls the corresponding three groups of indicator lights 150 to display three different colors, respectively.

Although in FIG. 9 the input of the AC-DC conversion circuit 120 and each outlet 140 are electrically coupled to the neutral line N, and each of them is electrically coupled to one of the AC power sources L1, L2, and L3, the invention is not limited thereto. For example, the input of the AC-DC conversion circuit 120 and each outlet 140 may be electrically coupled to two of the AC power sources L1, L2, and L3. Therefore, the outlets 140 electrically coupled to the AC power sources L1 and L2 are divided into a group, the outlets 140 electrically coupled to the AC power sources L2 and L3 are divided into a group, and the outlets 140 electrically coupled to the AC power sources L3 and L1 are divided into a group. In addition, the control circuit 230 controls the corresponding three groups of indicator lights 150 to display three different colors, respectively. In such an embodiment, the power distribution unit 200 only needs three conductors 110.

Figure 10:
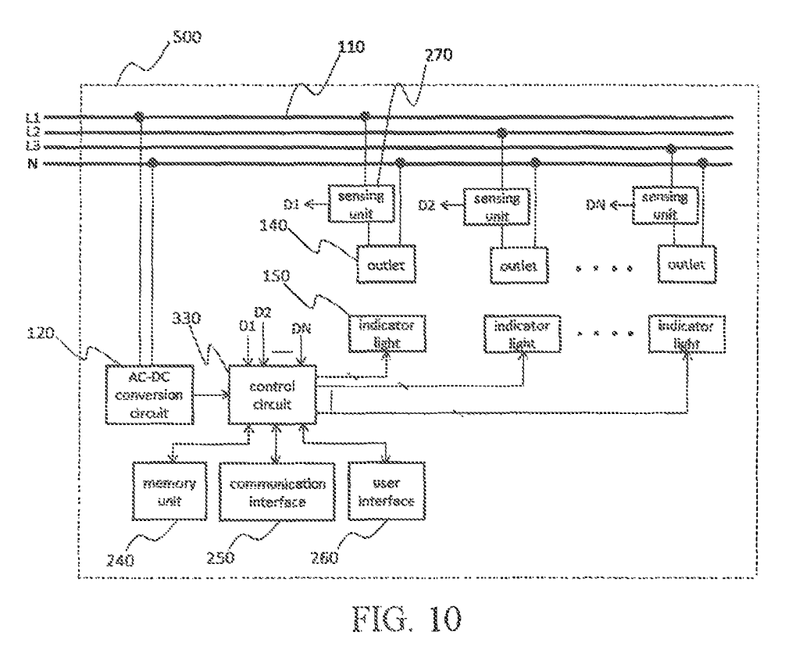
FIG. 10 is a schematic diagram of a power distribution unit according to yet another embodiment of the present invention.

FIG. 10 is a schematic diagram of a power distribution unit according to yet another embodiment of the present invention. Referring to FIGS. 10 and 9, compared with the power distribution unit 400 shown in FIG. 9, the power distribution unit 500 shown in FIG. 10 further comprises a plurality of sensing units 270. Each outlet 140 is electrically coupled to one of the conductors 110 through one of the sensing units 270, and each sensing unit 270 is used to measure current and to provide a sensing result (shown as D1-DN, respectively). In this embodiment, the control circuit 330 further calculates a corresponding loading according to each sensing result, and controls the displayed color of a corresponding indicator light 150. For example, when the control circuit 330 determines that, according to the to the sensing result D2, one of the devices of the equipment electrically coupled to a corresponding outlet 140 is overloaded, the control circuit 330 controls a corresponding indicator light 150 to display a specific color (e.g., orange) to represent this overload state.

In addition, the control circuit 330 may further calculate a corresponding loading according to each sensing result, and sum up the corresponding loadings of the outlets 140 in the same group to obtain a summation result, so as to control the displayed color of the corresponding indicator lights 150 of the outlets of the same group. For example, when the control circuit 330 determines that, according to the to a summation result, the equipment electrically coupled to the outlets 140 of the corresponding group is overloaded, the control circuit 330 controls the corresponding indicator lights 150 to display a specific color (e.g., yellow) to represent this overload state. Certainly, the input of the AC-DC conversion circuit 120 and each outlet 140 may be electrically coupled to two of the AC power sources L1, L2 and L3. Therefore, the outlets 140 electrically coupled to the AC power sources L1 and L2 are divided into a group, the outlets 140 electrically coupled to the AC power sources L2 and L3 are divided into a group, and the outlets 140 electrically coupled to the AC power sources L3 and L1 are divided into a group. In addition, the control circuit 230 controls the corresponding three groups of the indicator lights 150 to display three different colors, respectively. In such an embodiment, the power distribution unit 500 only needs three conductors 110.

In summary, since the indicator lights 150 corresponding to different groups of the outlets 140 can display different colors, the power distribution unit of the present invention makes service personnel quickly identify the types of the equipment which are electrically coupled to the outlets 140 of the power distribution unit, so as to improve the troubleshooting efficiency of the service personnel. In addition, this design manner also provides the flexibility for device changes in the future. Furthermore, the power distribution unit of the present invention can even show out different load states by the indicator lights 150, and can represent an emergency situation (e.g., an overload state) by controlling an indicator light 150 to display a specific color. This may further improve the troubleshooting efficiency of the service personnel.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power distribution unit, comprising:
   at least two conductors;
   a plurality of outlets, each of the outlets being electrically coupled to two of the conductors;
   a plurality of indicator lights, each of the indicator lights corresponding to one of the outlets;
   an AC-DC conversion circuit, the input of the AC-DC conversion circuit being electrically coupled to two of the conductors; and
   a control circuit, electrically coupled to the indicator lights and the output of the AC-DC conversion circuit, configured for sequentially driving the indicator lights and for controlling, according to the group information of each grouped outlet, a corresponding indicator light to display a corresponding color of a group to which the grouped outlet belongs.

2. The power distribution unit of claim 1, wherein each of the indicator lights has at least two light sources of different colors.

3. The power distribution unit of claim 2, wherein the control circuit has a plurality of first output pins and a plurality of second output pins, each of the first output pins is electrically coupled to an end of each of the light sources in one of the indicator lights, each of the second output pins is electrically coupled to the other end of each of the light sources having the same color in the indicator lights.

4. The power distribution unit of claim 3, wherein each of the light sources comprises a light-emitting diode.

5. The power distribution unit of claim 4, wherein the control circuit sequentially pulls up each of the first output pins to a first level for a predetermined time, and during each predetermined time the control circuit determines whether to pull down at least one second output pin to a second level according to the group information of a corresponding outlet of the predetermined time, wherein the second level is lower than the first level.

6. The power distribution unit of claim 4, wherein the control circuit sequentially pulls down each of the first output pins to a first level for a predetermined time, and during each predetermined time the control circuit determines whether to pull up at least one second output pin to a second level according to the group information of a corresponding outlet of the predetermined time, wherein the second level is higher than the first level.

7. The power distribution unit of claim 1, wherein the control circuit is further configured for recording the group information of each outlet.

8. The power distribution unit of claim 1, further comprising a memory unit, wherein the memory unit is electrically coupled to the control circuit and is configured for recording the group information of each outlet.

9. The power distribution unit of claim 1, further comprising a communication interface, wherein the communication interface is electrically coupled to the control circuit, so that the control circuit can receive group settings of any of the outlets through the communication interface.

10. The power distribution unit of claim 1, further comprising a user interface, wherein the user interface is electrically coupled to the control circuit, so that the control circuit can receive group settings of any of the outlets through the user interface.

11. The power distribution unit of claim 1, further comprising a plurality of sensing units, wherein each of the outlets is electrically coupled to one of the conductors through one of the sensing units, and each sensing unit is used to measure current and provide a sensing result.

12. The power distribution unit of claim 11, wherein the control circuit further calculates a corresponding loading according to each sensing result, and controls the displayed color of a corresponding indicator light.

13. The power distribution unit of claim 11, wherein the control circuit further calculates a corresponding loading according to each sensing result, and sums up the corresponding loadings of the outlets in the same group to obtain a summation result, so as to control the displayed color of the corresponding indicator lights of the outlets of the same group.

14. The power distribution unit of claim 1, wherein the conduction frequency of each light-emitting diode is at least 30 Hz.

* * * * *